(12) United States Patent
Shikita et al.

(10) Patent No.: US 6,982,772 B2
(45) Date of Patent: Jan. 3, 2006

(54) QUARTER WAVELENGTH PLATE AND PROJECTION TYPE VIDEO DISPLAY DEVICE USING SAME

(75) Inventors: Kazuo Shikita, Tokyo (JP); Tsutomu Nakashima, Tokyo (JP); Nobuyuki Kimura, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/356,294

(22) Filed: Jan. 31, 2003

(65) Prior Publication Data

US 2003/0174290 A1 Sep. 18, 2003

(30) Foreign Application Priority Data

Jan. 31, 2002 (JP) ........................ 2002-022683

(51) Int. Cl.
 *G02F 1/1335* (2006.01)

(52) U.S. Cl. ................. 349/117; 349/5; 349/118; 349/119; 349/120; 349/121

(58) Field of Classification Search ................ 349/117, 349/5, 118, 119, 120, 121
See application file for complete search history.

(56) References Cited

U.S. PATENT DOCUMENTS

| 4,712,880 | A |   | 12/1987 | Shirasaki |
| 5,327,270 | A |   | 7/1994  | Miyatake |
| 5,576,854 | A |   | 11/1996 | Schmidt et al. |
| 5,798,809 | A | * | 8/1998  | Nakamura et al. .......... 349/119 |
| 5,847,789 | A | * | 12/1998 | Nakamura et al. ............ 349/99 |
| 5,986,815 | A |   | 11/1999 | Bryars |
| 6,157,458 | A |   | 12/2000 | Zorabedian |

FOREIGN PATENT DOCUMENTS

| JP | 02-250026 | 10/1990 |
| JP | 05-333211 | 12/1993 |

* cited by examiner

*Primary Examiner*—Tarifur R. Chowdhury
*Assistant Examiner*—George Y. Wang
(74) *Attorney, Agent, or Firm*—Townsend and Townsend and Crew LLP

(57) ABSTRACT

A quarter wavelength plate for reducing the dependence of a retardation value on an incident beam angle in optically anisotropic crystals. The quarter wavelength plate is formed of optically anisotropic crystals in a thickness of 0.1 mm to 0.5 mm. The quarter wavelength plate can contribute to a reduction in the dependence of the retardation value on the angle at which a light beam impinges on the quarter wavelength plate, and to a reduction in color shading caused by a rise in temperature. A reflection type liquid crystal display device which employs the quarter wavelength plate can enhance the luminance and contrast.

3 Claims, 6 Drawing Sheets

QUARTER WAVELENGTH PLATE AND PROJECTION TYPE VIDEO DISPLAY DEVICE USING SAME

BACKGROUND OF THE INVENTION

The present invention relates to a quarter wavelength plate which is particularly advantageous in enhancing the contrast, and an optical unit using the same for use in a reflection type liquid crystal display device.

A reflection type liquid crystal display device using a reflex liquid crystal display element for displaying images is disclosed, for example, in JP-B-7-38050.

FIG. 1 is a schematic diagram illustrating an optical unit in the reflection type liquid crystal display device disclosed in the above-cited document. The optical unit herein referred to is assumed to be an optical display device which comprises a light source, an illumination optical system, a video display element, and a projection lens. The video display element is irradiated with light from the light source through the illumination optical system. A light intensity modulation is performed for converting the irradiated light to the contract of each pixel on the video display element. A resulting image is enlarged by the projection lens for display.

In FIG. 1, the optical unit comprises a light source 1, a polarization beam splitter 2, a quarter wavelength plate 3, a reflex liquid display element 4, and a projection lens 5.

Light from the light source 1 is split by the polarization beam splitter 2 into an S-polarization component which is reflected by the beam splitter 2 and a P-polarization component which transmits the beam splitter 2. The S-polarization component reflected by the polarization beam splitter 2 transmits the quarter wavelength plate 3 and impinges on the reflex liquid crystal display element 4. The S-polarization component is converted to a P-polarization component by the reflex liquid crystal display element 4. The resulting light for producing a bright display again transmits the quarter wavelength plate 3, and is projected onto a screen by the projection lens 5 along a light path which extends through the polarization beam splitter 2. The light not converted by the reflex liquid crystal display element 4 again transmits the quarter wavelength plate 3 and travels back to the light source 1 along a light path which is bent by the polarization beam splitter 2.

Here, the quarter wavelength plate 3 is used with the intention of improving the contrast which would be degraded by incident light on the polarization beam splitter, tilted with respect to the optical axis, in the reflection type liquid crystal display device, as disclosed in detail in JP-B-7-38050.

Materials suitably used for forming the quarter wavelength plate include, for example, a stretched polycarbonate film adhered on a glass substrate (hereinafter called the "phase difference film"), a crystal having optical anisotropy such as quartz.

FIG. 2 is a schematic diagram illustrating a quarter wavelength plate which is formed of a stretched polycarbonate film adhered on a glass substrate. In FIG. 2, the quarter wavelength plate comprises the glass substrate 6, the stretched polycarbonate film 7, and a phase delay axis 8 of the quarter wavelength plate.

FIG. 3 in turn is a schematic diagram illustrating a quarter wavelength plate formed of quartz, which is for use in a reflection type liquid crystal display device. In FIG. 3, the quarter wavelength plate 12 comprises a reference axis 9; a first optically anisotropic crystal 10 having a phase delay axis $13_1$ which is parallel with the reference axis 9; and a second optically anisotropic crystal 11 having a phase delay axis $13_2$ which is perpendicular to the reference axis 9. The quarter wavelength plate 12 is formed by adhering the first optically anisotropic crystal 10, the phase delay axis $13_1$ of which is parallel with the reference axis 9, to the second optically anisotropic crystal 11, the phase delay axis $13_2$ of which is perpendicular to the reference axis 9. The quarter wavelength plate 12 has a thickness $t$ which is conventionally set to approximately 1.0 mm from a viewpoint of workability.

In the optical unit for use in a reflection type liquid crystal display device, a retardation value required to a quarter wavelength plate is in a range of 100 to 180 nm because visible light has wavelengths ranging from 400 to 700 nm. The retardation value used herein refers to the product of a difference between the refractive index in the direction of the phase delay axis of the quarter wavelength plate and the refractive index in the direction of the phase advance axis perpendicular to the phase delay axis (hereinafter called the "birefringence difference") and the thickness of the quarter wavelength plate. However, for providing the above-mentioned retardation value, for example, with a quarter wavelength plate formed of quartz chosen from among optically anisotropic crystals, the quarter wavelength plate must be made to have a thickness of approximately 15 $\mu$m or less because quartz has the birefringence difference of approximately 0.009. However, a quarter wavelength plate having a thickness of 15 $\mu$m or less is virtually impossible from viewpoints of the yield rate and strengths of parts in the manufacturing. To solve this problem, two optically anisotropic crystals having a thickness of approximately 1.0 mm are adhered with their phase delay axes oriented orthogonal to each other, as illustrated in FIG. 3. By ensuring that a difference between the retardation value of the first optically anisotropic crystal, the phase delay axis of which is parallel with the reference axis, and the retardation value of the second optically anisotropic crystal, the phase delay axis of which is perpendicular to the reference axis, falls within a range of 100 to 180 nm, it is possible to achieve the retardation value required for a quarter wavelength plate for use in an optical unit of a reflection type liquid crystal display device.

SUMMARY OF THE INVENTION

As described above, a quarter wavelength plate can be formed of a phase difference film comprising a stretched polycarbonate film or the like adhered to a glass substrate, crystals having optical anisotropy such as quartz, and the like. However, with a quarter wavelength plate formed by adhering a phase difference film made of polycarbonate or the like to a substrate, a change in temperature of the quarter wavelength plate causes the phase difference film to distort due to thermal shrinkage of the phase difference film itself, resulting in color shading on the reflection type liquid crystal display device, as will be later described. The phase difference film distorts because the stretched polycarbonate film is molded into the phase difference film in which a rising temperature produces a force that acts to drive the phase difference film to shrink in the direction opposite to the stretched direction. The distortion of the phase difference film is also caused by a large coefficient of linear expansion of polycarbonate which is on the order of $7 \times 10^{-5}/°$ C.

FIG. 4 shows schematic diagrams for explaining the relationship between the thermal shrinkage of a quarter wavelength plate using a phase difference film and color shading on a liquid crystal display device. In FIG. 4, the phase difference film 14 includes distorted regions 15; a range 16 through which a light beam passes on the quarter wavelength plate; and a phase delay axis 8. A displayed image 17 includes color shading 18. Thermal shrinkage causes a change in thickness of the quarter wavelength plate, resulting in a deviation of the retardation value from a desired value in the distorted regions 15 in the phase difference film 14 of the quarter wavelength plate. Thus, within the beam passing range 16 in the quarter wavelength plate, light passing through the distorted regions 15 cannot benefit from a contrast improving effect produced by the quarter wavelength plate, resulting in uneven luminance in regions 18 corresponding to the distorted regions 15 in the image 17 displayed on the single-plate reflection type liquid crystal display device. A three-plate reflection type liquid crystal display device, in turn, employs quarter wavelength plates on three RGB optical paths, respectively, so that distortions of the quarter wavelength plates appear as color shading in the periphery of an image.

To reduce the uneven luminance and color shading, it is necessary to sufficiently cool down the quarter wavelength plate to prevent distortions. However, in the optical unit configured as illustrated in FIG. 1, since the reflex liquid crystal display element 4 is located near the quarter wavelength plate 3, heat generated when the reflex liquid crystal display element 4 absorbs light is transferred to the quarter wavelength plate 3. It is therefore difficult to cool the quarter wavelength plate 3 down to temperatures at which the liquid crystal display device is free from color shading. The prior art does not take into consideration the problem on the uneven luminance and color shading.

On the other hand, when a used quarter wavelength plate is made of crystals having optical anisotropy such as quartz, the inventors newly found that although a rise in temperature hardly affects the uneven luminance or color shading, such a quarter wavelength plate has a problem in the dependence of retardation value on an incident beam angle, exhibited by the optically anisotropic crystals. This dependence causes a change in the retardation value of the quarter wavelength plate as the F-value is smaller in an illumination optical system of the reflection type liquid crystal display device, thereby failing to provide a sufficient contrast improving effect, as compared with a quarter wavelength plate formed of polycarbonate.

While an increased F-value in the illumination optical system of the reflection type liquid crystal display device could reduce the influence of the dependence on the incident beam angle exerted on the contrast of the reflection type liquid crystal display device, the increased F-value means that a smaller light flux is emitted from a light source, thus excluding the use of a lamp having a large illuminator, for example, a ultra-high pressure mercury lamp for enhancing the luminance. This is a disadvantage against the trend of enhancing the luminance which is a challenge in the liquid crystal display device.

To solve the foregoing problem, the present invention proposes a quarter wavelength plate which reduces the uneven luminance and color shading caused by a rise in temperature and is advantageous in enhancing the contrast and luminance, and an optical unit which employs the quarter wavelength plate.

The present invention provides an optical unit for use in a reflection type liquid crystal display device for leading illumination light emitted from a light source into a reflex liquid crystal display element through a polarization beam splitter and, projecting the light reflected by the reflex liquid crystal display element by a projection lens. The optical unit includes a quarter wavelength plate disposed between the polarization beam splitter and reflex liquid crystal display element. The quarter wavelength plate is formed of two optically anisotropic crystals adhered to each other such that phase delay axes thereof are oriented substantially orthogonal to each other. The quarter wavelength plate has a thickness in a range of 0.1 mm to 0.5 mm.

Other objects, features and advantages of the invention will become apparent from the following description of the embodiments of the invention taken in conjunction with the accompanying drawings.

DETAILED DESCRIPTION OF THE EMBODIMENTS

Figure 1:
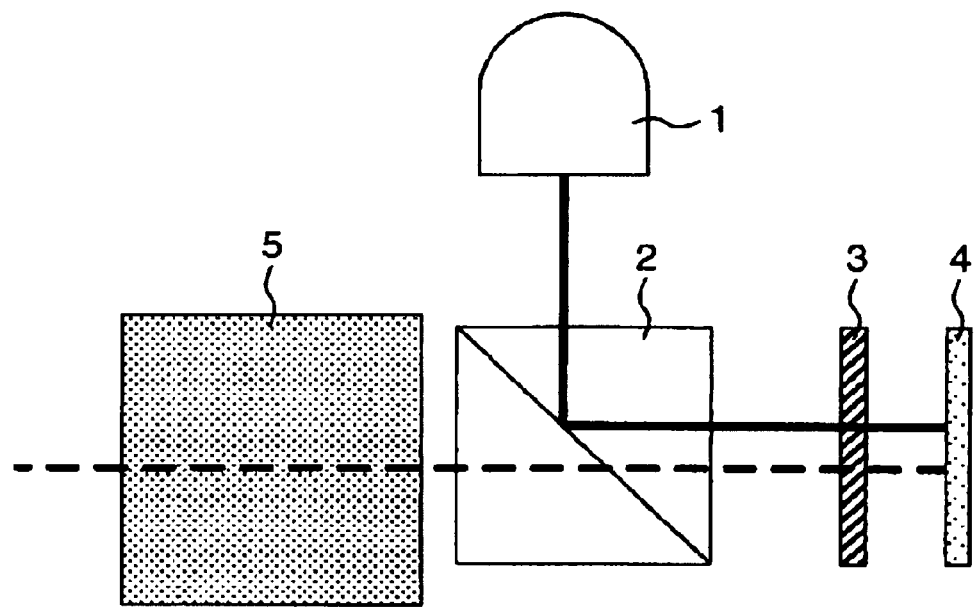
FIG. 1 is a schematic diagram illustrating an optical unit in a prior art reflection type liquid crystal display device.

In the following, embodiments of the present invention will be described in detail with reference to the accompanying drawings. In the drawings, parts identical to those in the previously referenced drawings are designated the same reference numerals, and repeated description will be omitted.

Figure 5:
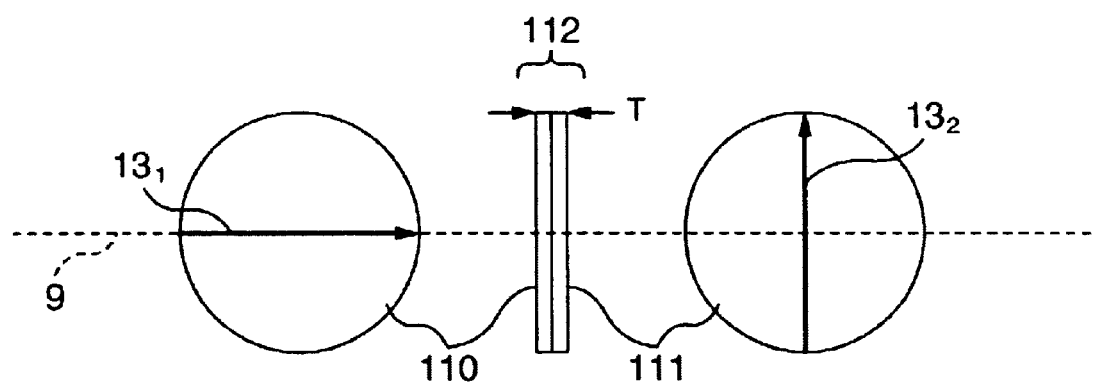
FIG. 5 is a schematic diagram illustrating one embodiment of a quarter wavelength plate according to the present invention.

FIG. 5 is a schematic diagram illustrating a quarter waveform plate according to one embodiment of the present invention which is formed by adhering two optically anisotropic crystals with their phase delay axis oriented orthogonal to each other. The quarter wavelength plate has a thickness of 0.1 mm or more and 0.5 mm or less.

In FIG. 5, the quarter wavelength plate 112 comprises a first optically anisotropic crystal 110 having a phase delay axis $13_1$ oriented in parallel with a reference axis 9; and a second optically anisotropic crystal 111 having a phase delay axis $13_2$ oriented perpendicular to the reference axis 9. The quarter wavelength plate 112 is formed by adhering the first crystal 110 and second crystal 111 in a thickness T in a range of 0.1 mm to 0.5 mm.

Figure 6:
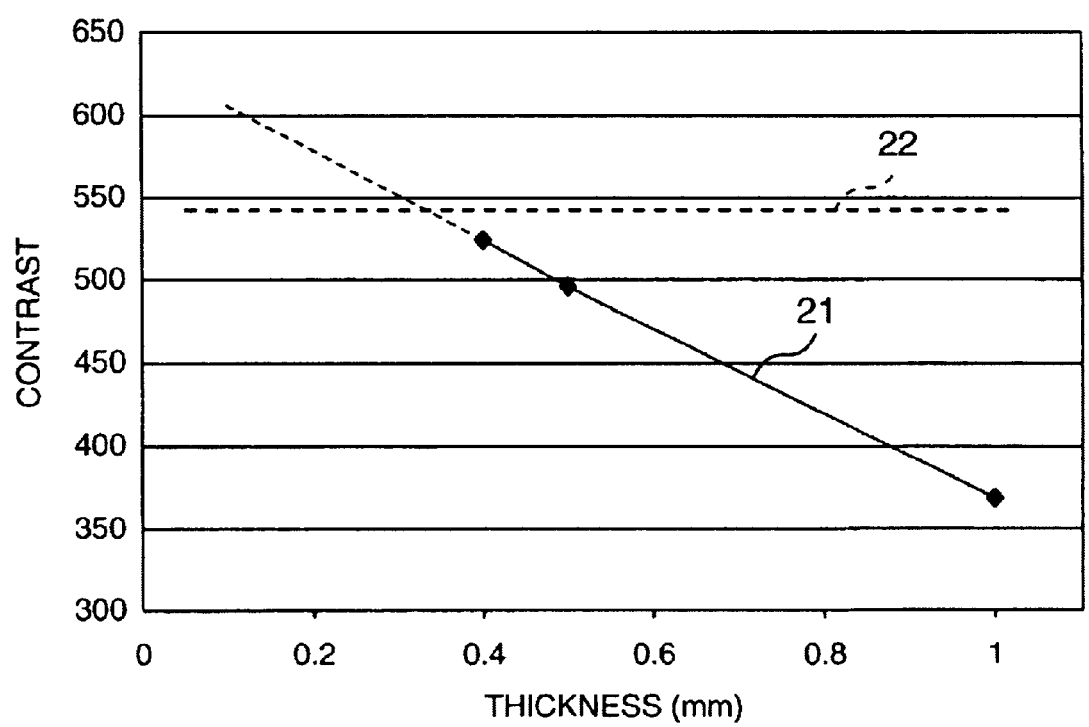
FIG. 6 is a graph showing the relationship between the thickness of the quarter wavelength plate illustrated in FIG. 5 and the contrast on a reflection type liquid crystal display device when the quarter wavelength plate is applied in the reflex liquid crystal display.

FIG. 6 is a graph showing the relationship between the thickness of the quartz-based quarter wavelength plate formed of the optically anisotropic crystals illustrated in FIG. 5 and the contrast on a reflection type liquid crystal display device. illustrated in FIG. 10 (later described), when the quarter wavelength plate is used in the reflection type liquid crystal display device.

Figure 2:
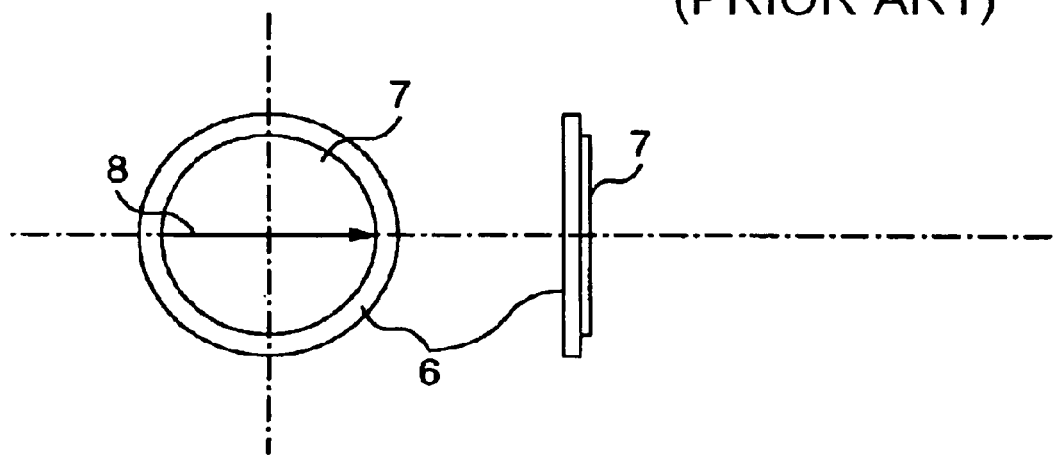
FIG. 2 is a schematic diagram illustrating a quarter wavelength plate formed of a polycarbonate film.
Figure 3:
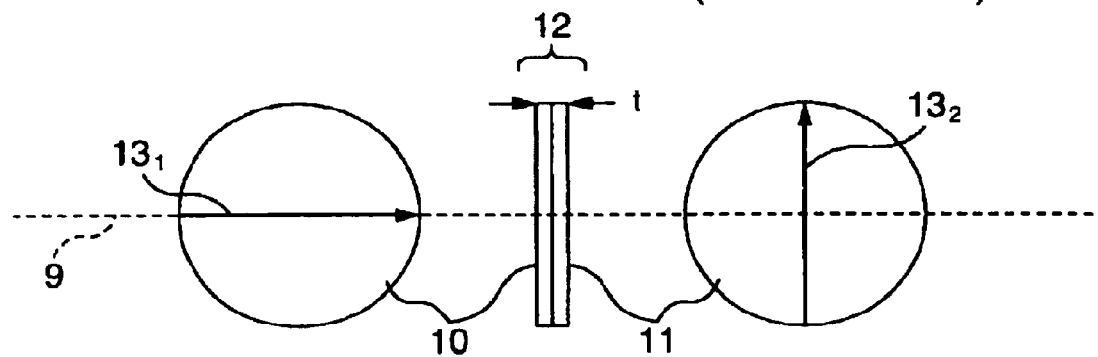
FIG. 3 is a schematic diagram illustrating a quarter wavelength plate formed of two optically anisotropic crystals which are adhered with their phase delay axes oriented orthogonal to each other.
Figure 4:
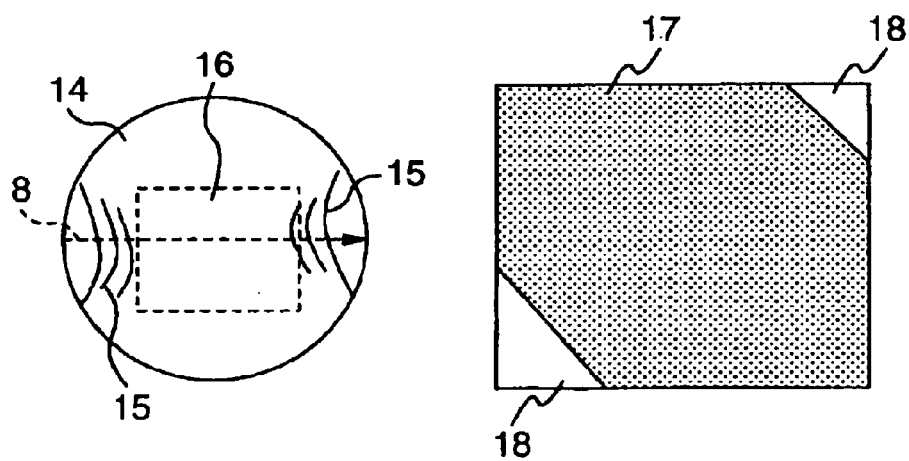
FIG. 4 is a diagram for explaining the relationship between thermal shrinkage of a quarter wavelength plate using a phase difference film and color shading on a liquid crystal display device.

In FIG. 6, a line 21 represents the relationship between the thickness of the quartz-based quarter wavelength plate formed of the optically anisotropic crystals and the contrast on the reflection type liquid crystal display device, and a line 22 represents the contrast on a reflection type liquid crystal display device which uses the conventional quarter wavelength plate (0.1 mm in thickness) formed of a phase difference film made of polycarbonate previously illustrated in FIG. 2. The line 21 includes a solid line which represents actually measured values and a dotted line which represents estimates derived from the measured values.

FIG. 6 demonstrates that a reduction in the thickness of the quarter wavelength plate substantially linearly improves the dependence of the retardation value on the incident beam angle exhibited by the optically anisotropic crystals in reciprocal proportion to the thickness, resulting in an improved contrast.

As is apparent from FIG. 6, for achieving the contrast equivalent to that provided by the quarter wavelength plate formed of the phase difference film made of polycarbonate, it is necessary to reduce the thickness of the quartz-based quarter wavelength plate, formed of the optically anisotropic crystals, to 0.5 mm or less.

However, taking into account the strength of the quarter wavelength plate, the yield rate in the manufacturing, and the like, the quarter wavelength plate formed of the optically anisotropic crystals preferably has the thickness of 0.1 mm or more.

Figure 7:
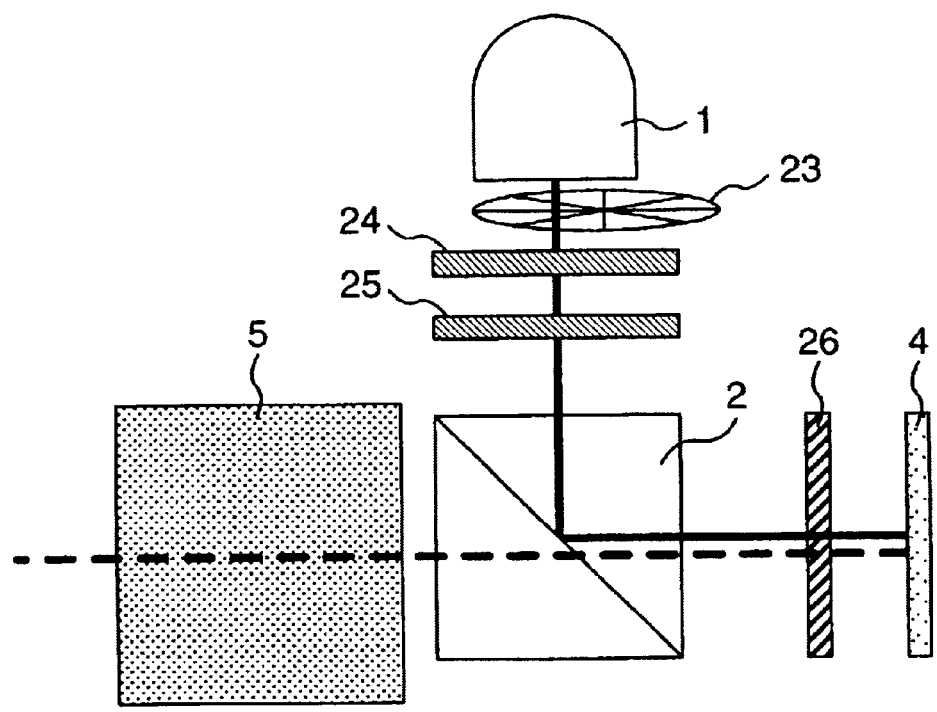
FIG. 7 is a block diagram illustrating one embodiment of an optical unit for a single-plate reflex liquid crystal projector which employs the quarter wavelength plate according to the present invention.

FIG. 7 is a schematic diagram illustrating one embodiment of an optical unit for a single-plate reflex liquid crystal projector which employs the quarter wavelength plate according to the present invention.

In FIG. 7, white light radiated from a light source 1 is separated into RGB colors in time division by a rotatable color wheel 23 which comprises color filters corresponding to red (R), green (G) and blue (B), respectively. The RGB light is subsequently unified into S-polarized light by a polarization conversion element 24, and an unnecessary P-polarized light is removed by a polarizing plate 25. The S-polarized light passing through the polarizing plate 25 is reflected by a polarization beam splitter 2, transmits a quarter wavelength plate 26, and impinges on a reflex liquid crystal display element 4. The light converted to P-polarized light by the reflex liquid crystal display element 4 for producing a bright display transmits the quarter wavelength plate 26 and the polarization beam splitter 2, and is enlarged by a projection lens 5 for projecting an enlarged image. The S-polarized light, not converted to the P-polarized light, transmits the quarter wavelength plate 26, and is reflected by the polarization beam splitter 2 back to the light source 1.

In the projector described above, assuming that the quarter wavelength plate 26 is formed by adhering, for example, two quartz made of optically anisotropic crystals adhered with their phase delay axes oriented orthogonal to each other, the reflection type liquid crystal display device can reduce uneven luminance due to a rise in temperature and enhance the luminance and contrast, when the quarter wavelength plate 26 is fabricated to have a thickness of 0.5 mm or less.

Figure 8:
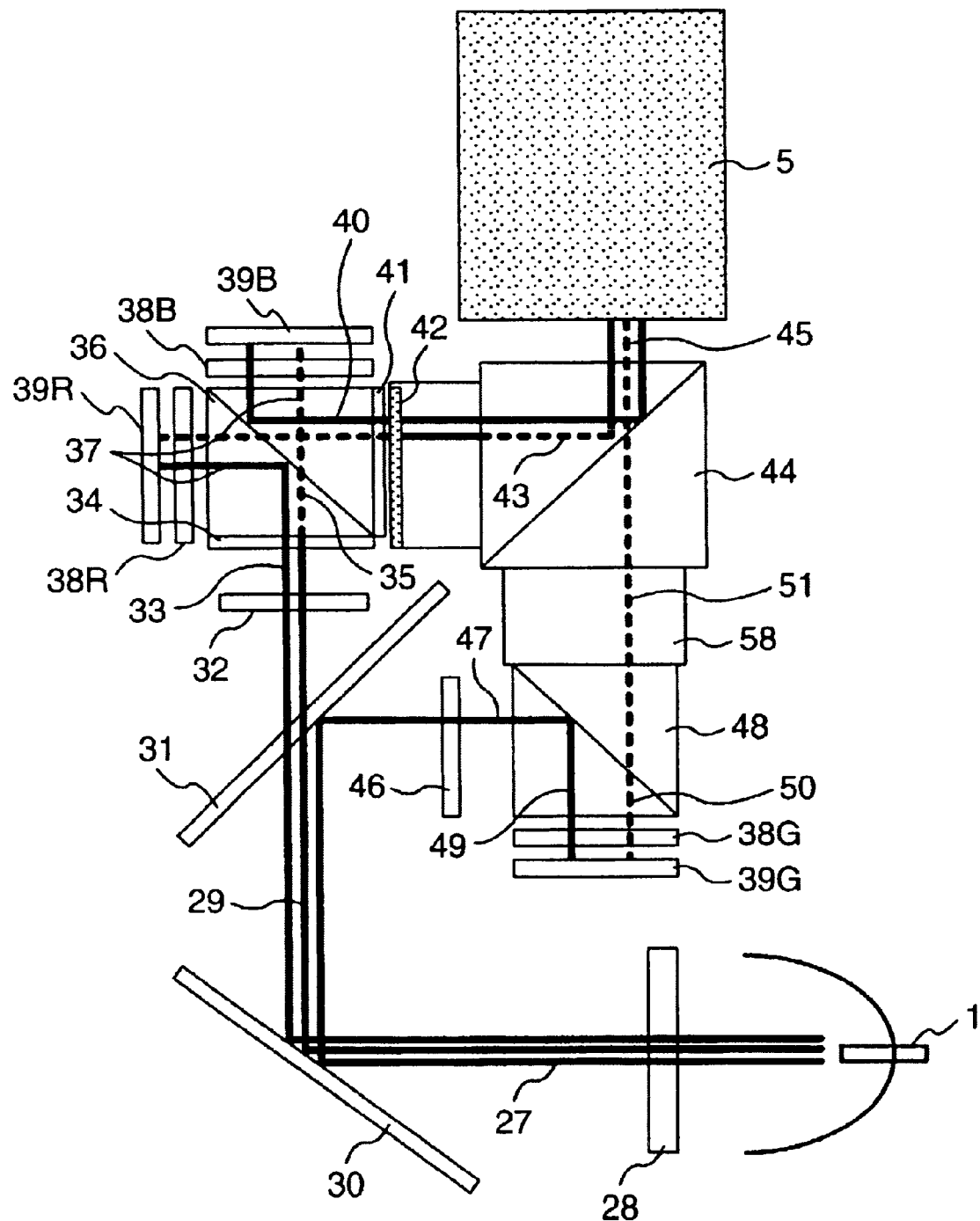
FIG. 8 is a block diagram illustrating one embodiment of an optical unit for a three-plate reflex liquid crystal projector which employs the quarter wavelength plates according to the present invention.

FIG. 8 is a schematic diagram illustrating one embodiment of an optical unit for a three-plate reflex liquid crystal projector which employs the quarter wavelength plates according to the present invention.

In FIG. 8, white light 27 radiated from a light source 1 is converted to S-polarized light 29 by a polarization conversion element 28. The S-polarized light 29, after reflected by a total reflection mirror 30, impinges on a dichroic mirror 31 which reflects green (G) light and transmits red (R) and blue (B) light, and are separated into two light paths for the G light and RB mixed light. A trace of P-polarized light included in the RB mixed light is removed by a polarizing plate 32, so that the RB mixed light is converted to S-polarized RB light 33.

The S-polarized RB light 33 impinges on a polarization rotating element 34 for rotating B light for separation into S-polarized R light 35R and P-polarized B light 35B. The S-polarized R light 35R incident on a polarization beam splitter 36 is reflected by the splitter plane, and resulting S-polarized R light 37R impinges on a reflex liquid crystal display element 39R through a quarter wavelength plate 38R on the R light path.

On the other hand, the P-polarized B light 35B incident on the polarization beam splitter 36 transmits the splitter plane, and resulting P-polarized B light 37B impinges on a reflex liquid crystal display element 39B through a quarter wavelength plate 38B.

Here, the light for producing a bright display is reflected by a reflex liquid crystal display element 39R, and denoted by P-polarized R light 40R, while light not contributing to the display, i.e., S-polarized R light is reflected as it is. The P-polarized R light 40R for producing a bright display again passes through the quarter wavelength plate 38R, impinges on the polarization beam splitter 36 and transmits the splitter plane because it is now P-polarized light.

Similarly, the light for producing a bright display is reflected by the blue reflex liquid crystal display element 39B, and denoted by S-polarized B light 40B, while light not contributing to the display, i.e., P-polarized B light is reflected as it is. The S-polarized B light 40B for producing a bright display again impinges on the reflection beam splitter 36, and is reflected by the splitter plane because it is now S-polarized light. Then, the S-polarized B light 40B is combined with the P-polarized R light 40R.

The combined P-polarized R light 40R and S-polarized B light 40B impinge on a polarized light rotating element 41 for rotating red polarized light, wherein the S-polarized B light 40B becomes S-polarized B light 43B without change, while the P-polarized R light 40R is rotated and changed to S-polarized R light 43R. In the S-polarized R light 43R and S-polarized B light 43B thus matched in polarization, an unwanted P-polarization component included in unwanted B light is cut away by a polarizing plate 42 dedicated to B light to improve the contrast of B light. The S-polarized R light 43R and S-polarized B light 43B further impinge on a polarization beam splitter 44, are reflected by the splitter plane, and exit from the polarization beam splitter 44 as S-polarized R light 45R and S-polarized B light 45B.

A polarizing plate 46 removes P-polarized light from the S-polarized G light reflected by the dichroic mirror 31, resulting in S-polarized G light 47. The S-polarized G light 47 incident on a polarization beam splitter 48 is reflected by the splitter plane, and exits from the polarization beam splitter 48 as S-polarized G light 49 which impinges on a reflex liquid crystal display element 39G through a quarter wavelength plate 38G.

The light for producing a bright display is now reflected as P-polarized G light 50 which transmits again the quarter wavelength plate 38B and then impinges on the polarization beam splitter 48. The P-polarized G light 50 transmits the splitter plane, because it is now P-polarized light, and exits from the polarization beam splitter 48 as P-polarized G light 51. The P-polarized G light 51 passes through a light path length adjusting plate 58 and impinges on the polarization beam splitter 44. The P-polarized G light 51 transmits the splitter plane and exits from the polarization beam splitter 44 as P-polarized G light 45G which passes along the same light path as the S-polarized R light 45R and S-polarized B light 45B, and is combined with the S-polarized R light 45R and S-polarized B light 45B in color. The light path length adjusting plate 58 is provided for adjusting the R/B-light path and G-light path to be equal in length.

The P-polarized G light 38G, S-polarized R light 45R, and S-polarized B light 45B, combined in color, are enlarged and projected onto a screen (not shown) by a projection lens 5. In this event, the phase delay axes of the quarter wavelength plates 38R, 38B, 38G are adjusted by an adjusting mechanism, not shown, at angles at which the respective polarization beam splitters 36, 48 can be used as optimal polarizers.

With the use of a quarter wavelength plate formed of optically anisotropic crystals in a thickness of 0.5 mm or less for the quarter wavelength plate 38R on the R light path; the quarter wavelength plate 38B on the B light path; and the quarter wavelength plate 38G on the G light path, the resulting reflection type liquid crystal display device can reduce color shading caused by a rise in temperature, and enhance the luminance and contrast.

If any of the quarter wavelength plate 38R on the R light path, the quarter wavelength plate 38B on the B light path, and the quarter wavelength plate 38G on the G light path presents a significant rise in temperature, with the remaining two being at sufficiently low temperatures, the quarter wavelength plate formed of optically anisotropic crystals in a thickness of 0.5 mm or less may be used only for the quarter wavelength plate which presents a significant rise in temperature, in which case the resulting reflection type liquid crystal display device can also reduce color shading caused by a rise in temperature, and enhance the luminance and contrast, as will be obvious.

In addition, a lens for correcting chromatic aberration inherent in the projection lens 5 may be adhered to at least one of the quarter wavelength plate 38R on the R light path, the quarter wavelength plate 38B on the B light path, and the quarter wavelength plate 38G on the G light path, resulting in a reduced shift in an enlarged image produced by the RGB light to display a fine image.

Figure 9:
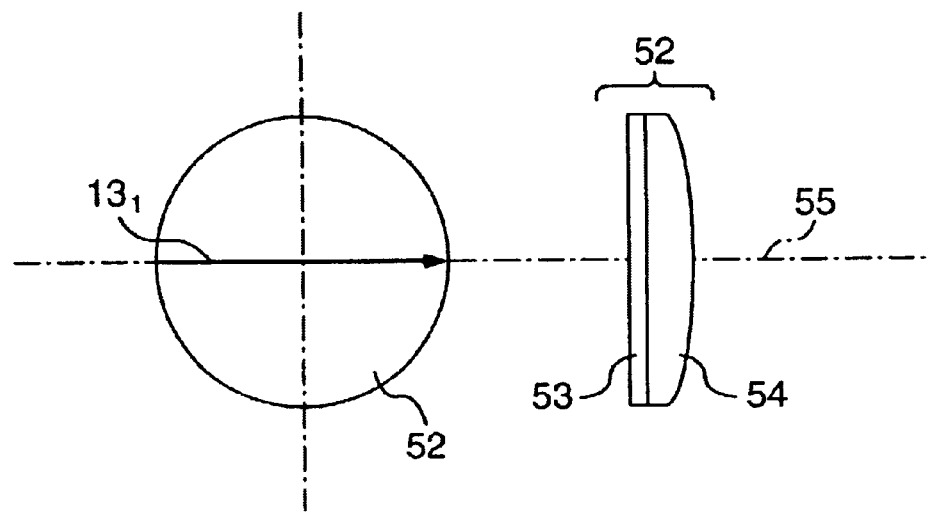
FIG. 9 is a schematic diagram illustrating a quarter wavelength plate which includes a lens adhered thereto for correcting chromatic aberration.

FIG. 9 shows a schematic diagram of an optics formed by adhering a lens for correcting chromatic aberration to a quarter wavelength plate. In FIG. 9, the optics 52 comprises the quarter wavelength plate 53 according to the present invention, and a lens 54 for correcting chromatic aberration which has an optical axis 55. The optics 52 is formed by adhering the lens 54 to the quarter wavelength plate 53. Components in FIG. 9 identical to the previous drawings are designated the same reference numerals, and description thereon is omitted.

In this embodiment, with the lens 54 for correcting chromatic aberration adhered to the quarter wavelength plate 53, the chromatic aberration inherent in the projection lens 5 can be corrected while the number of interfaces on which light is reflected is maintained equal to that of a single quarter wavelength plate, so that the optics 52 is advantageous in enhancing the luminance and contrast. In addition, no problem arises in correcting the chromatic aberration when the quarter wavelength plate, to which the lens is adhered, is formed of polycarbonate.

As will be obvious, similar advantages can be provided by using the quarter wavelength plate according to the present invention between a polarization beam splitter and a reflection liquid crystal display element in any optical unit in a configuration other than that described in the foregoing embodiment.

Figure 10:
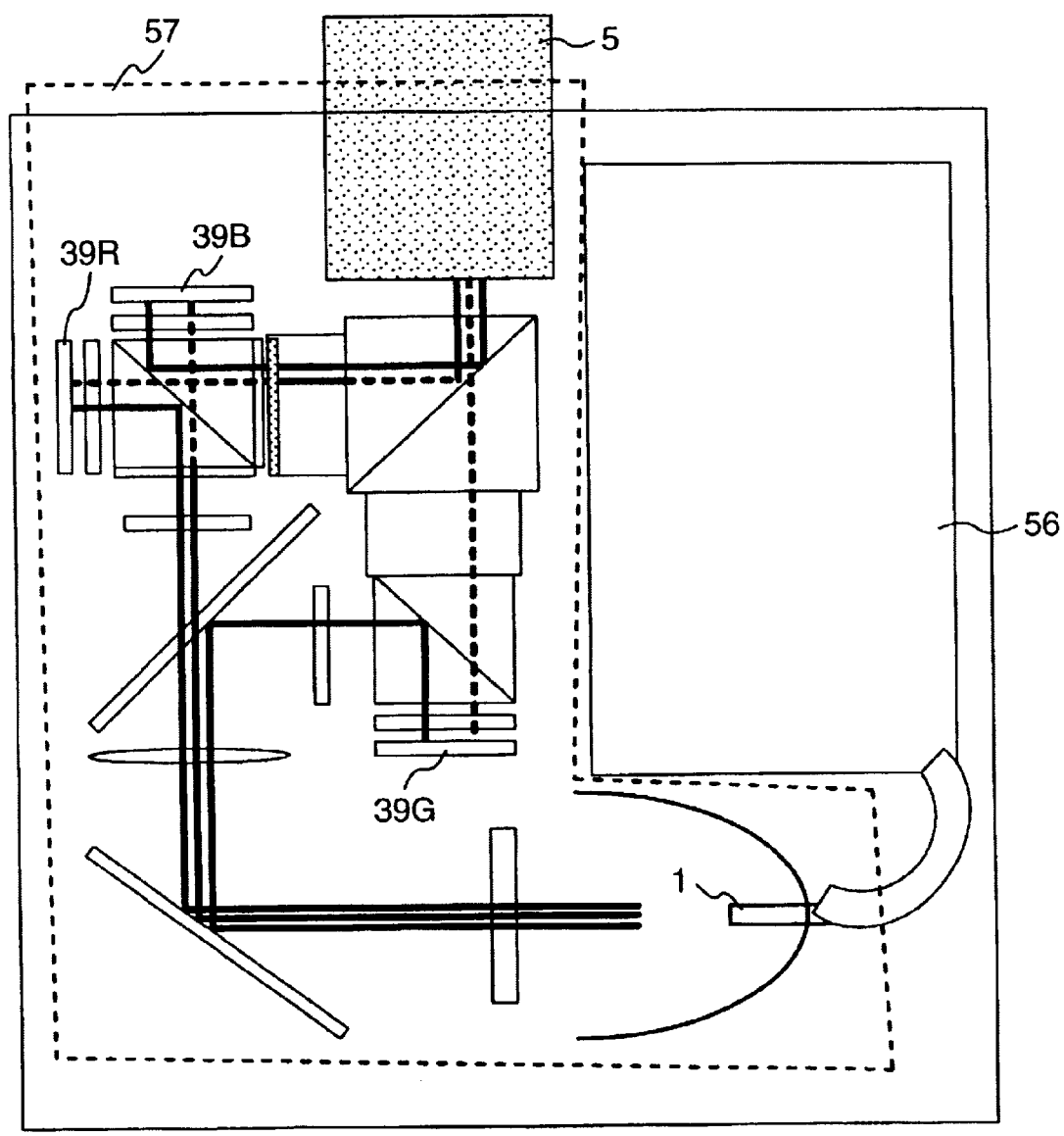
FIG. 10 is a block diagram illustrating the configuration of a liquid crystal projector which employs the optical unit illustrated in FIG. 8.

FIG. 10 is a schematic top plan view of an optical system in a liquid crystal projector which employs the optical unit according to the embodiment illustrated in FIG. 8. The embodiment illustrated in FIG. 10 generally shows a three-plate reflex liquid crystal projector which employs the optical unit 57 illustrated in FIG. 8 and the reflex liquid crystal display elements 39R, 39G, 39B corresponding to the three primary colors R, G, B.

In the following, the embodiment of the three-plate reflex liquid crystal projector will be described in detail with reference to FIG. 10. In FIG. 10, a light source 1 may be a white light source such as an ultra-high pressure mercury lamp, a metal halide lamp, a xenon lamp, a mercury xenon lamp, a halogen lamp, and the like. A power supply 56 is provided for powering the light source 1 and reflex liquid crystal display elements 39R, 39G, 39B. Illumination light emitted from the light source 1 impinges on the respective reflex liquid crystal display elements 39R, 39G, 39B through the optical unit 57, such that a light of video image is enlarged and projected by a projection lens 5.

The reflex liquid crystal display elements 39R, 39G, 39B comprise liquid crystal display units corresponding in number to pixels to be displayed (for example, 1,024 pixels horizontal and 768 pixels vertical in three colors). Then, in response to a signal inputted from an external driving circuit (not shown), a polarized light rotating angle changes in the liquid crystal display unit corresponding to each pixel, so that an image corresponding to signals inputted to the respective reflex liquid crystal display elements 39R, 39G, 39B is enlarged and projected onto a screen by the projection lens 5.

In this embodiment, the optical unit described in connection with FIG. 8 can be applied to the reflex liquid crystal projector which eventually provides high contrast and high luminance images.

It should be understood that the foregoing exemplary configuration is merely a single specific example to which this embodiment should not be limited, and the advantages provided by this embodiment can be developed even when the positions of the R, G, B reflex liquid crystal display elements are interchanged to one another.

In addition, the color separation/combination system is not either limited to the foregoing embodiment, but similar advantages can be provided for an optical unit which has a quarter wavelength plate between a polarization beam splitter and a reflex liquid crystal display element.

As appreciated from the foregoing, the present invention provides a quarter wavelength plate which can reduce color shading caused by a rise in temperature and enhance the luminance and contrast, and an optical unit using the quarter wavelength plate.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A quarter wavelength plate used in a projection type video display device comprising:
   a first optically anisotropic crystal having a first thickness; and
   a second optically anisotropic crystal having a second thickness,
   wherein the first and second optically anisotropic crystals adhered to each other such that phase delay axes thereof are oriented substantially orthogonal to each other,
   wherein said quarter wavelength plate having a thickness in a range of 0.1 mm to 0.5 mm,
   wherein a difference between the first and second thicknesses is in a range of 10 $\mu$m to 20 $\mu$m, inclusive.

2. A projection type video display device comprising:
   a light source;
   a reflex liquid crystal display element;
   an illumination optical system for leading illumination light emitted from said light source onto said reflex liquid crystal display element through a polarization beam splitter;
   a projection lens for projecting the light reflected by said reflex liquid crystal display element; and
   a quarter wavelength plate disposed between said polarization beam splitter and said reflex liquid crystal display element, said quarter wavelength plate comprising two optically anisotropic crystals adhered to each other such that phase delay axes thereof are oriented substantially orthogonal to each other,
   wherein said quarter wavelength plate having a thickness in a range of 0.1 mm to 0.5 mm, and
   wherein a difference between a thickness of said two optically anisotropic crystals is in a range of 10 $\mu$m to 20 $\mu$m, inclusive.

3. A projection type video display device according to claim 2, further comprising:
   a lens adhered to said quarter wavelength plate for correcting chromatic aberration.

* * * * *